(12) United States Patent
Park et al.

(10) Patent No.: US 8,170,470 B2
(45) Date of Patent: May 1, 2012

(54) ON-CHANNEL REPEATER AND ON-CHANNEL REPEATING METHOD

(75) Inventors: Sung-Ik Park, Daejon (KR); Heung-Mook Kim, Daejon (KR); Ho-Min Eum, Daejon (KR); Jae-Hyun Seo, Daejon (KR); Jae-Young Lee, Seoul (KR); Yong-Tae Lee, Daejon (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 190 days.

(21) Appl. No.: 12/669,815

(22) PCT Filed: Nov. 9, 2007

(86) PCT No.: PCT/KR2007/005650
§ 371 (c)(1),
(2), (4) Date: Jan. 20, 2010

(87) PCT Pub. No.: WO2009/014281
PCT Pub. Date: Jan. 29, 2009

(65) Prior Publication Data
US 2010/0221998 A1 Sep. 2, 2010

(30) Foreign Application Priority Data
Jul. 20, 2007 (KR) .................. 10-2007-0072636

(51) Int. Cl.
*H04B 3/36* (2006.01)
*H04B 17/02* (2006.01)
*H04B 7/15* (2006.01)
*H04B 7/14* (2006.01)

(52) U.S. Cl. .................. 455/7; 455/11.1; 455/16; 455/9

(58) Field of Classification Search ............. 455/7, 11.1, 455/16, 15, 9
See application file for complete search history.

(56) References Cited

U.S. PATENT DOCUMENTS

| 6,028,887 | A  | * | 2/2000  | Harrison et al. | 375/147 |
| 6,862,316 | B2 | * | 3/2005  | Tomisato et al. | 375/232 |
| 7,430,397 | B2 | * | 9/2008  | Suda et al.     | 455/7   |
| 7,603,117 | B2 | * | 10/2009 | Karabinis       | 455/427 |

FOREIGN PATENT DOCUMENTS

| JP | 2002-077096 A | 3/2002 |
| JP | 2003-174392 A | 6/2003 |
| JP | 2004-187135 A | 7/2004 |
| JP | 2007-510353 A | 4/2007 |
| KR | 1020060112586 A | 11/2006 |
| WO | 2005/041571 A1 | 5/2005 |
| WO | 2005/109876 A1 | 11/2005 |
| WO | 2006/115320 A1 | 11/2006 |

OTHER PUBLICATIONS

International Search Report: PCT/KR2007/005650.

* cited by examiner

*Primary Examiner* — Tilahun B Gesesse
(74) *Attorney, Agent, or Firm* — Ladas & Parry LLP

(57) ABSTRACT

Provided are an on-channel repeater for repeating an output signal the same as an input signal on channel by removing feedback signals caused by low isolation of a transmission/reception antenna by converting a transmitted Radio Frequency (RF) signal into a signal of a predetermined band and subtracting a replica of the feedback signal from the converted signal, and by compensating for channel distortion of a reception signal by estimating an inverse of reception channel from a signal acquired by removing the feedback signal, and an on-channel repeating method.

14 Claims, 13 Drawing Sheets

ON-CHANNEL REPEATER AND ON-CHANNEL REPEATING METHOD

TECHNICAL FIELD

The present invention relates to an on-channel repeater and an on-channel repeating method; and, more particularly, to a repeater for repeating an output signal the same as an input signal on channel by removing feedback signals caused by low isolation of a transmission/reception antenna by converting a transmitted Radio Frequency (RF) signal into a signal of a predetermined band and subtracting a replica of the feedback signal from the converted signal, and by compensating for channel distortion of a reception signal by estimating an inverse of reception channel from a signal acquired by removing the feedback signal, and an on-channel repeating method.

This work was supported by the IT R&D program for MIC/IITA [2007-S-006-01, "Development of On-Channel RF repeating technology based on OFDM modulation"].

BACKGROUND ART

Repeaters are set up in an area where signals are weakly received from a main transmitter to resolve a problem of instable signal reception and widen signal transmission coverage of the main transmitter.

FIG. 1 shows a conventional repeating system where different frequencies are used among the repeaters.

Referring to FIG. 1, a main transmitter 101 transmits a signal of a frequency A and each of repeaters 102 to 105 repeats a signal of frequencies B, C, D and E, respectively, which are different from the frequency A. The conventional repeating system uses signals of the frequencies B, C, D and E, which are different for the repeater 102 to 105 respectively. Since a plurality of frequency bands are used, many frequency resources are required and it is inefficient in the respect of using the frequency.

FIG. 2 shows another conventional repeating system where the same frequency is used among repeaters.

A main transmitter 201 transmits a signal of a frequency A and on-channel repeaters 202 to 205 repeat the signal in the same frequency A. The signals of the same frequency transmitted from the main transmitter 201 and the on-channel repeaters 202 to 205 should be individually identified for on-channel repeating.

However, when the signals of the same frequency band outputted from the main transmitter and the repeaters are different, the signals are not removed as on-channel interference signals by an equalizer or other devices in each repeater.

Also, when the signals transmitted from the main transmitter and the on-channel repeaters have a time delay longer than a predetermined level, the equalizer cannot remove the delayed signal. Therefore, the output signals of the on-channel repeater should be the same as the output signals of the main transmitter for on-channel repeating, and the time delay of two output signals should be short.

Problems of the conventional on-channel repeaters will be described with reference to FIGS. 3 to 7.

FIG. 3 is a block diagram showing a conventional RF amplification on-channel repeater.

Referring to FIG. 3, a reception antenna 301 and an RF receiver 302 receive RF signals transmitted from the main transmitter. An RF band-pass filter 303 passes only signals of a predetermined signal band in the received RF signals and a high-power amplifier 304 amplifies the band-passed RF signals. The amplified RF signal is transmitted through on-channel through a transmission antenna 305.

FIG. 4 is a block diagram showing a conventional Intermediate Frequency (IF) conversion on-channel repeater.

Referring to FIG. 4, a reception antenna 401 and an RF receiver 402 receive RF signals transmitted from the main transmitter. An IF down-converter 403 converts the received RF signals into IF signals based on a reference frequency provided by a local oscillator (LO) 408. An IF band-pass filter 404 passes the IF signals of a predetermined band. An RF up-converter 405 converts the band-passed IF signals into n RF signals based on the reference frequency provided by the local oscillator 408. A high-power amplifier 406 amplifies the RF signals and the amplified RF signals are transmitted through a transmission antenna 407.

FIG. 5 is a block diagram showing a conventional on-channel repeater employing surface acoustic wave (SAW) filter.

Referring to FIG. 5, a reception antenna 501 and an RF receiver 502 receive RF signals transmitted from the main transmitter and an IF down-converter 503 converts the received RF signals into IF signal based on a reference frequency provided by a local oscillator 508.

A SAW filter 504 passes IF signals of a predetermined band. An RF up-converter 505 converts the band-passed IF signals into RF signals based on the reference frequency provided by the local oscillator 508. A high-power amplifier 506 amplifies the RF signals and the amplified. RF signals are transmitted through a transmission antenna 507.

Since the on-channel repeater of FIGS. 3 to 5 cannot remove noise and multi-path signals caused in a channel between the main transmitter and the on-channel repeater, feedback signals caused by low isolation of a transmission/reception antenna, and system noise added in an on-channel repeater system, it has a characteristic that an output signal is inferior than an input signal. Also, there is another problem in that the feedback signals generated due to the low isolation of the transmission and reception antennas restrict the transmission output power of the on-channel repeaters.

FIG. 6 is a block diagram showing a conventional on-channel repeater performing a modulating/demodulating procedure.

Referring to FIG. 6, a reception antenna 601 and an RF receiver 602 receive RF signals transmitted from the main transmitter. An IF down-converter 603 converts the received RF signals into IF signals based on a reference frequency provided by a local oscillator 611. A demodulator 604 demodulates the IF signals into baseband signals. An equalizing and forward error correction (FEC) decoding unit 605 remove noise and multi-path signals caused in a channel between the main transmitter and the on-channel repeater from the demodulated baseband signal, and feedback signals caused by low isolation of a transmission/reception antenna. A FEC decoder 606 performs coding for error correction of output signals of the equalizing and FEC decoding unit 605. A modulator 607 converts the FEC encoded signals into signals of an IF band. An RF up-converter 608 converts the IF signals into an RF signal based on a reference frequency provided by a local oscillator 611. A high-power amplifier 609 amplifies the RF signals and the amplified RF signals are transmitted through a transmission antenna 610.

Through the equalizing and FEC decoding unit, the on-channel repeater of FIG. 6 improves the multi-path and noise removing capability which is the problem of the repeater shown in FIGS. 3 to 5. However, since the on-channel repeater includes the equalizing and FEC decoding unit, it increases time delay from a microsecond unit to a millisecond unit. In addition, the transmission output power is limited when the feedback signals generated by ambiguity of a standard Trellis encoder of the FEC encoder is not removed in the repeater.

FIG. 7 is a block diagram showing a conventional on-channel repeater capable of compensating for distortion of a reception channel.

Referring to FIG. 7, an RF receiver 701 receives RF signals transmitted from the main transmitter and a down-converter 702 converts the received RF signals into signals of a desired band.

An inverse channel estimator 703 estimates an inverse of the reception channel including noise and multi-path signals caused in a channel between the main transmitter and the repeater from the converted signal, and feedback signals caused by low isolation of a transmission/reception antenna.

An adaptive filter 704 compensates for channel distortion based on inverse information of the estimated reception channel.

An up-converter 705 converts the compensated signals into RF signal and an RF transmitter 706 transmits the converted RF signals.

When the electric field strength of feedback signals (which are caused by low isolation of the transmission and reception antennas) is higher than the electric field strength of the input signal transmitted from main transmitter, the on-channel repeater of FIG. 7 does not remove distortion signals in the adaptive filter and does not estimate an inverse of the reception channel in the inverse channel estimator, thereby causing malfunction of the repeater.

Since the conventional technologies have a limitation in their removing capability of feedback signals, the conventional on-channel repeating systems have a low applicability in using a typical repeating facility and require a great deal of investment.

Therefore, it is required to develop an on-channel repeater having characteristics that the output signals of the on-channel repeater is the same as the output signals of the main transmitter, that the time delay between two output signals is small, that a characteristic of the on-channel repeater output signal becomes superior to that of the on-channel repeater input signal by removing the noise and multi-path signals caused in the channel between the main transmitter and the on-channel repeater, and that the applicability is raised and the small amount of investment is required by increasing transmission output power of the on-channel repeater by removing the feedback signals caused by the low isolation of transmission and reception antennas in the on-channel repeater.

DISCLOSURE

Technical Problem

An embodiment of the present invention is directed to providing a repeater for repeating an output signal the same as an input signal on channel by removing feedback signals caused by low isolation of a transmission/reception antenna from a transmitted Radio Frequency (RF) signal and compensating for channel distortion of a reception signal by estimating an inverse of a reception channel from a signal acquired by removing the feedback signal, and an on-channel repeating method.

Technical Solution

In accordance with an aspect of the present invention, there is provided an on-channel repeater, including: a receiver for receiving a Radio Frequency (RF) signal and converting the RF signal into a baseband signal; a subtractor for subtracting a replica of feedback signals from the signal received in the receiver; an inverse channel estimator for estimating an inverse of a reception channel based on the signal acquired from the subtraction in the subtractor and generating filter tab coefficients; a first adaptive filter for compensating for channel distortion of the signal acquired from the subtraction in the subtractor based on the filter tab coefficients generated by the inverse channel estimator; a transmitter for converting the signal whose channel distortion is compensated by the first adaptive filter into an RF signal and performing radio transmission; a down-converter for down-converting the RF signal acquired in the transmitting means into a baseband signal; and a replica generator for calculating a replica based on the baseband signal acquired from the conversion in the down-converting means and the signal acquired from the subtraction in the subtractor, and feeding back the replica to the subtractor.

In accordance with another aspect of the present invention, there is provided an on-channel repeating method, including: receiving an RF signal and converting the RF signal into a baseband signal; subtracting a replica of feedback signals from the received signal; estimating an inverse of a reception channel based on the signal acquired from the subtraction, and generating filter tab coefficients; compensating for channel distortion of the signal acquired from the subtraction based on the generated filter tab coefficients; performing radio transmission by converting the signal whose channel distortion is compensated into an RF signal; and down-converting the RF signal acquired in the transmitting means into a baseband signal, where the replica is calculated based on the baseband signal acquired from the down-conversion and the signal acquired from the subtraction, and is fed back to said subtracting the replica of the feedback signal.

In accordance with another aspect of the present invention, there is provided an on-channel repeater, including: a receiver for receiving an RF signal and converting the RF signal into a predetermined band signal; a subtractor for subtracting a replica of feedback signals from the signal received in the receiver; an inverse channel estimator for estimating an inverse of a reception channel based on the signal acquired from the subtraction in the subtractor and generating filter tab coefficients; a first adaptive filter for compensating for channel distortion of the signal acquired from the subtraction based on the filter tab coefficients generated by the inverse channel estimator; a transmitter for converting the signal whose channel distortion is compensated by the first adaptive filter into an RF signal and performing radio transmission; a down-converter for down-converting the RF signal acquired in the transmitting means into a predetermined band signal; and a replica generator for calculating a replica based on the predetermined band signal acquired from the conversion in the down-converter and the signal acquired from the subtraction in the subtractor, and feeding back the replica to the subtractor.

In accordance with another aspect of the present invention, there is provided an on-channel repeating method, including: receiving an RF signal and converting the RF signal into a predetermined band signal; subtracting a replica of feedback signals from the received RF signal; estimating an inverse of a reception channel based on the signal acquired from the subtraction in said subtracting the replica of the feedback signals, and generating filter tab coefficients; compensating for channel distortion of the signal acquired from the subtraction based on the generated filter tab coefficients; performing radio transmission by converting the signal whose channel distortion is compensated into an RF signal; and down-converting the RF signal acquired in the transmitting means into the predetermined band signal, wherein the replica is calculated based on the predetermined band signal converted in the step of down-converting the RF signal and the signal acquired from the subtraction in the step of subtracting the replica of the feedback signal, and is fed back to said subtracting the replica of the feedback signal.

Advantageous Effects

As described above, the present invention can increase efficiency of limited frequency resources by repeating a signal that is the same as output signal of a main transmitter, has a short time delay between the output signals of the on-channel repeater and the main transmitter, and has its distortion caused in a transmission channel compensated.

BEST MODE FOR THE INVENTION

The advantages, features and aspects of the invention will become apparent from the following description of the embodiments with reference to the accompanying drawings, which is set forth hereinafter. The preferred embodiments of the present invention will be described in detail hereinafter with reference to the attached drawings.

Figure 1:
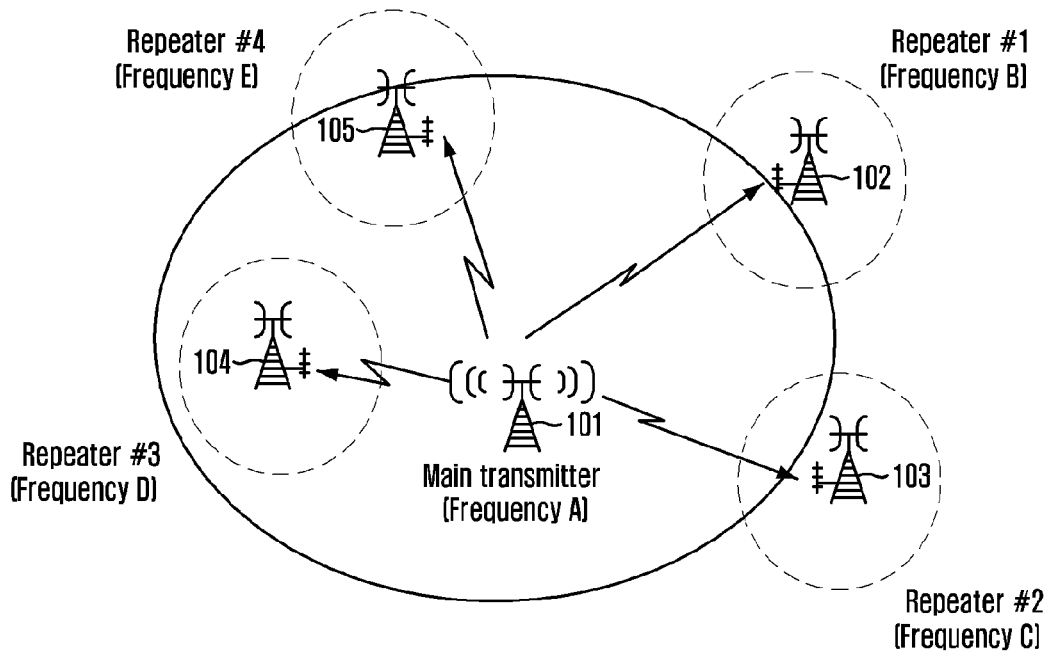
FIG. 1 shows a conventional repeating system using different frequencies.
Figure 2:
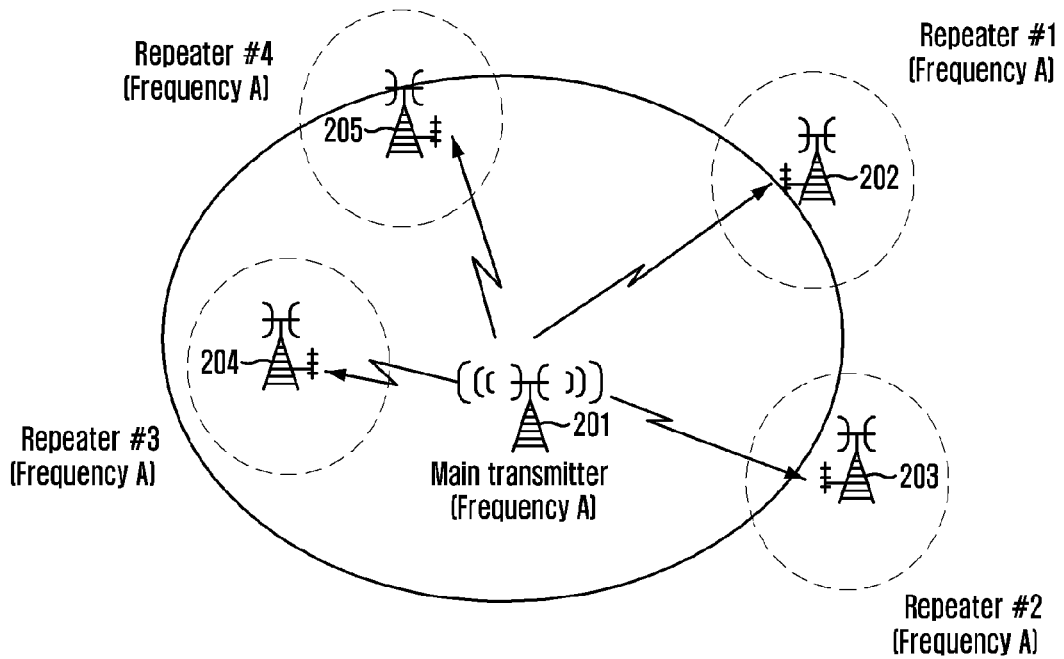
FIG. 2 shows a conventional repeating system using the same frequency.
Figure 3:
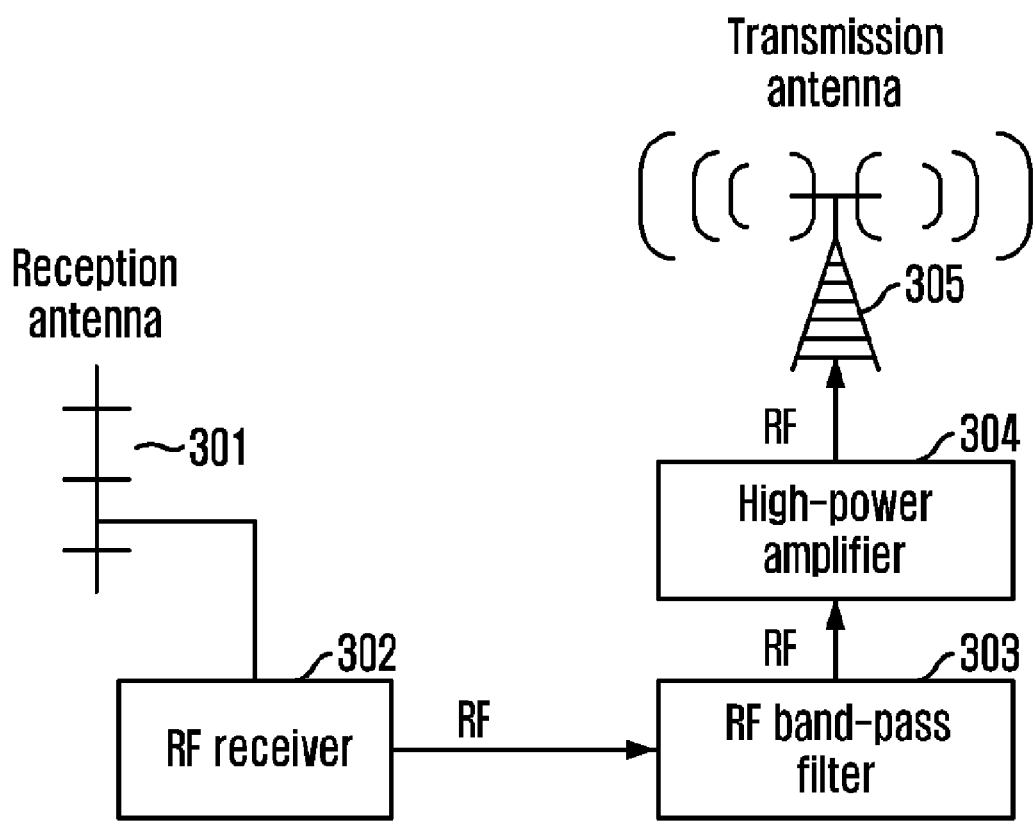
FIG. 3 is a block diagram showing a conventional Radio Frequency (RF) amplification on-channel repeater.
Figure 4:
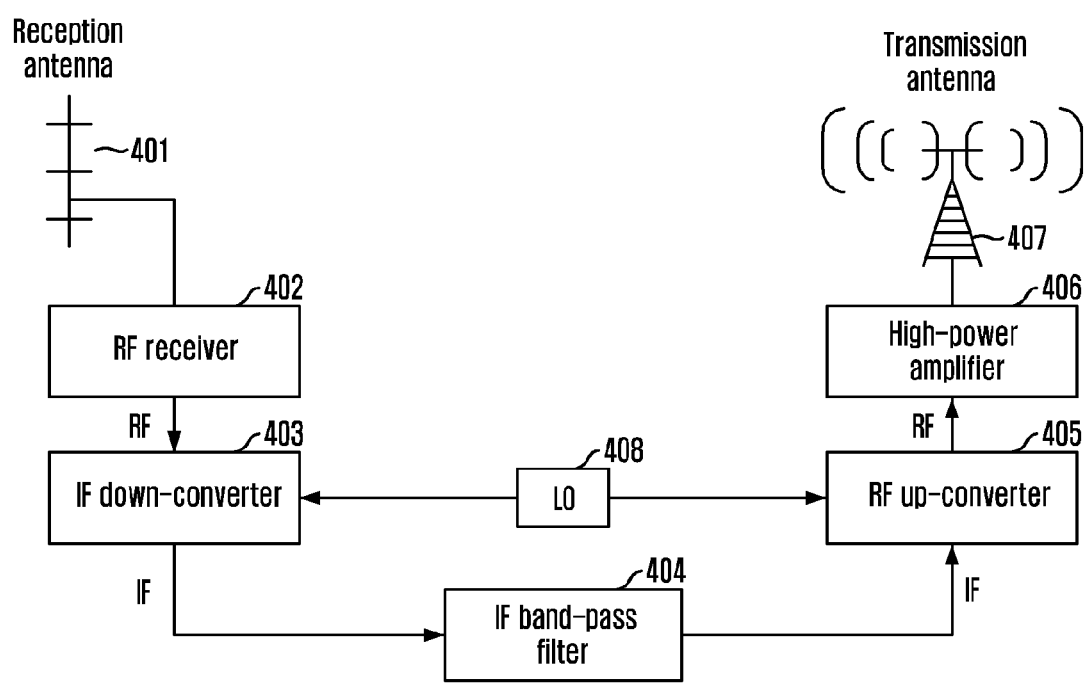
FIG. 4 is a block diagram showing a conventional Intermediate Frequency (IF) conversion on-channel repeater.
Figure 5:
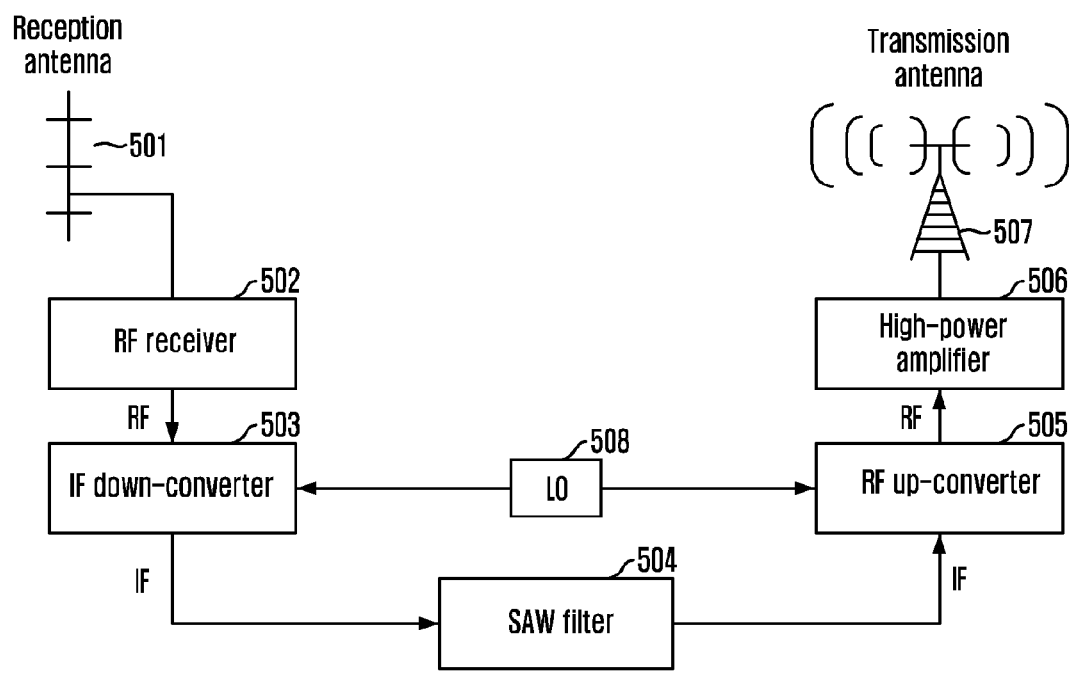
FIG. 5 is a block diagram showing a conventional on-channel repeater employing a surface acoustic wave (SAW) filter.
Figure 6:
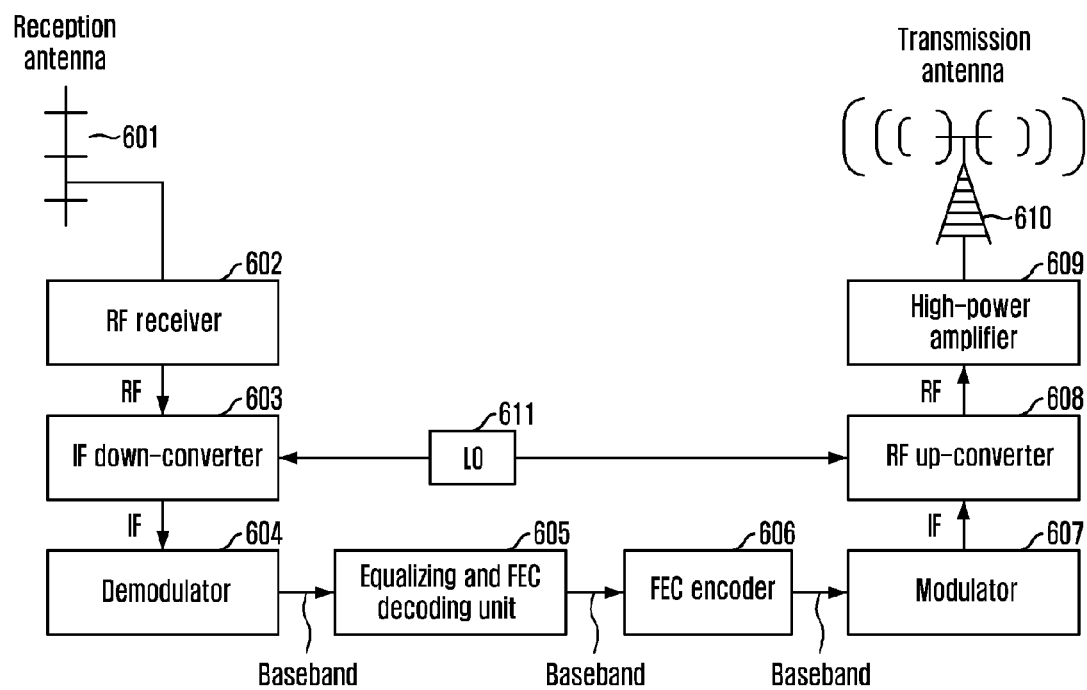
FIG. 6 shows a conventional on-channel repeater performing a modulating/demodulating procedure.
Figure 7:
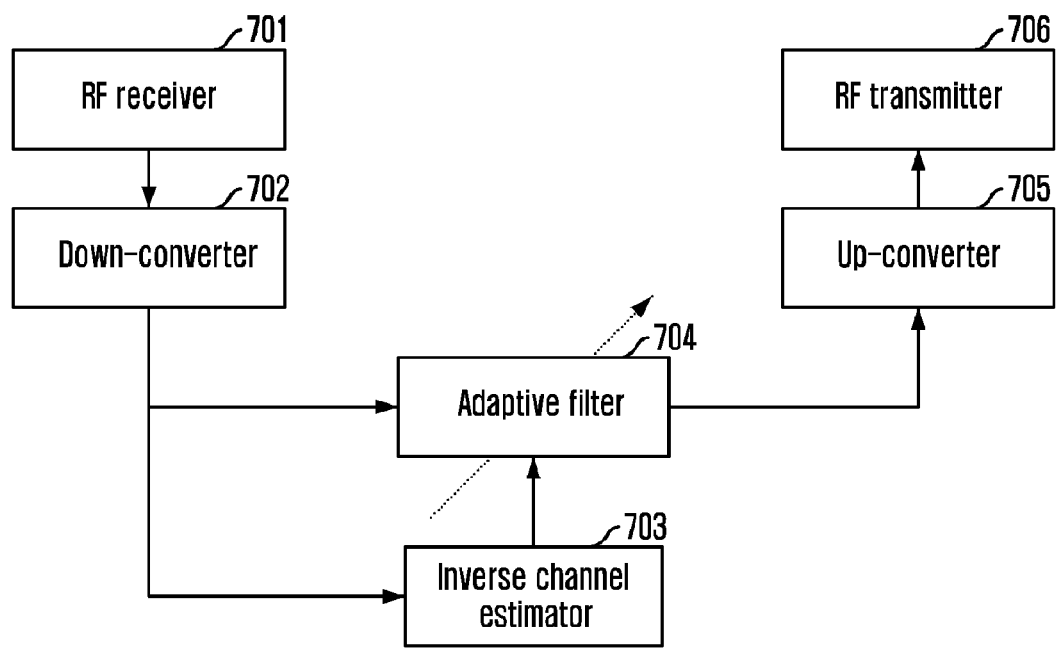
FIG. 7 is a block diagram showing a conventional on-channel repeater capable of compensating for distortion of a reception channel.
Figure 8:
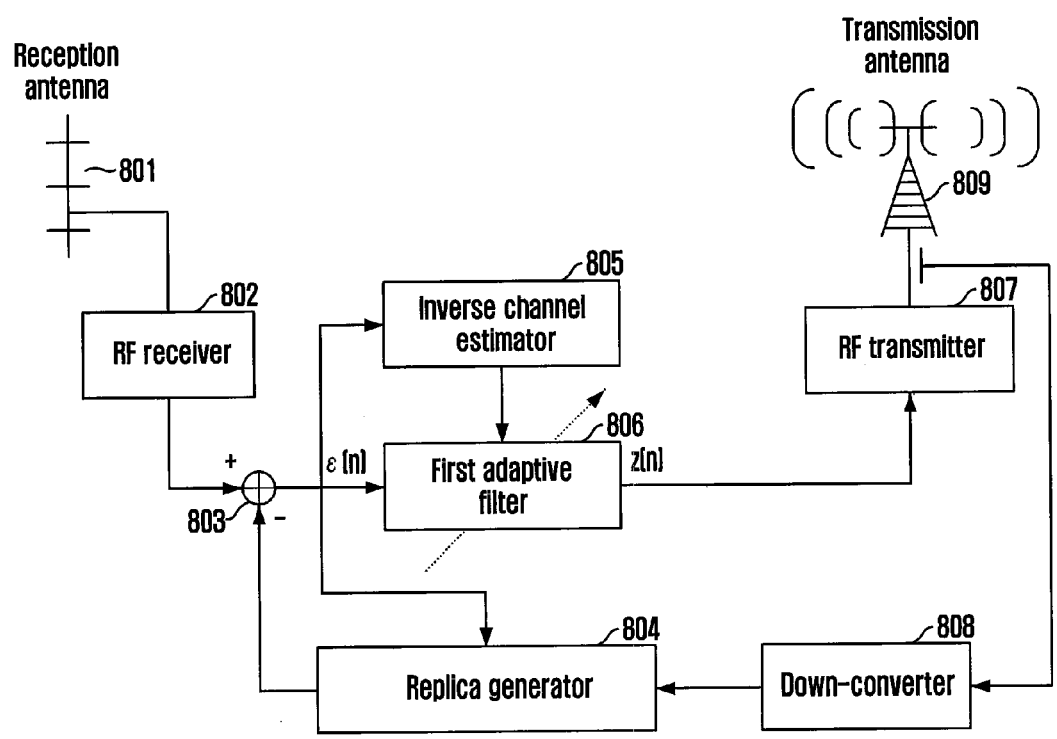
FIG. 8 is a block diagram showing an on-channel repeater in accordance with an embodiment of the present invention.

FIG. 8 is a block diagram showing an on-channel repeater in accordance with an embodiment of the present invention.

Referring to FIG. 8, the on-channel repeater in accordance with the present invention includes a reception antenna 801, a Radio Frequency (RF) receiver 802, a subtractor 803, a replica generator 804, an inverse channel estimator 805, a first adaptive filter 806, an RF transmitter 807, a down-converter 808, and an RF transmission antenna 809.

The RF receiver 802 down-converts RF signals transmitted from a main transmitter or another repeater through the reception antenna 801 into signals of a desired band.

The subtractor 803 removes feedback signals by subtracting a replica of feedback signals from the predetermined band signal down-converted by the RF receiver 802.

The replica generator 804 generates a replica of the feedback signals based on signal acquired from the down-conversion into signal of a predetermined band by the down-converter 808 and a signal outputted from the subtractor 803, i.e., a signal acquired by removing the feedback signals, and feeds back the replica to the subtractor 803.

The inverse channel estimator 805 generates filter tab coefficients by estimating an inverse of a reception channel including noise, multi-path signals and remaining feedback signals based on the signal outputted from the subtractor 803. Herein, the remaining feedback signals mean feedback signals which is not removed through subtraction in the subtractor 803.

In accordance with the present invention, the subtractor 803 and the replica generator 804 only remove the feedback signals but do not affect the time delay of the repeater system.

The first adaptive filter 806 compensates for the channel distortion of the signal outputted from the subtractor 803 by performing filtering according to Equation 1 based on the filter tab coefficients generated by the inverse channel estimator 805.

$$z(n) = \sum_{i=0}^{N-1} c_i \cdot \varepsilon(n-1) \qquad \text{Eq. 1}$$

where, $\varepsilon(n)$ is an output signal of the subtractor 803, $z(n)$, is an output signal of the first adaptive filter 806, $c_i$ is a tab coefficient $\bar{c}=c_0, c_1, \ldots, c_{N-1}$) estimated by the inverse channel estimator 805, and N is the number of tabs.

The RF transmitter 807 converts the signal outputted from the first adaptive filter 806 into RF signal and performs radio transmission through the RF transmission antenna 809.

The down-converter 808 down-converts the RF signal converted by the RF transmitter 807 into signal of a predetermined band.

Figure 9:
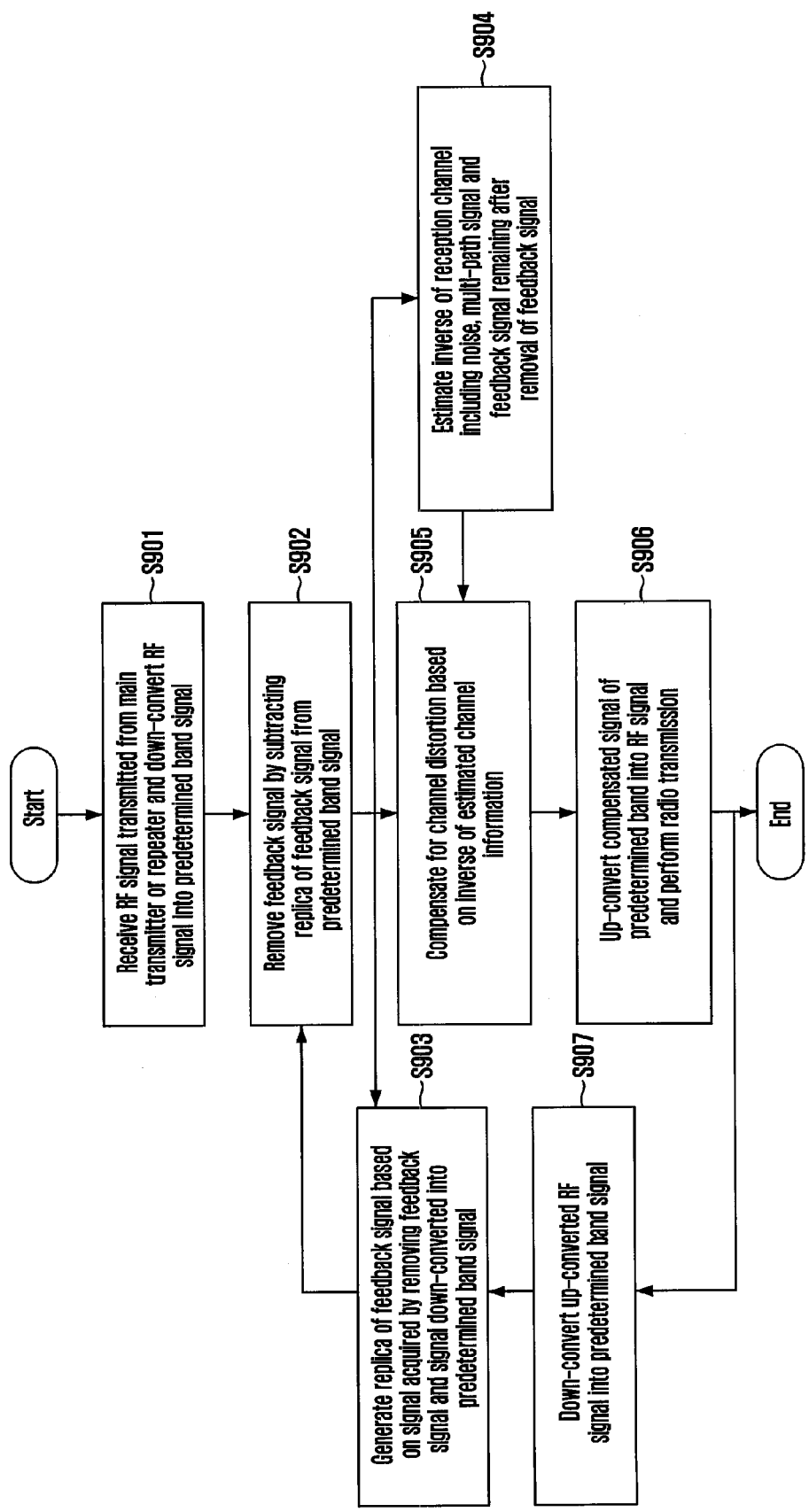
FIG. 9 is a flowchart describing a repeating method in the on-channel repeater of FIG. 8.

FIG. 9 is a flowchart describing a repeating method in the on-channel repeater of FIG. 8.

Referring to FIG. 9, RF signal transmitted from the main transmitter or another repeater is received through the reception antenna 801 and is down-converted into signal of a desired band in the RF receiver 802 at step S901.

The subtractor 803 removes feedback signals from the output signal of the RF receiver 802 at step S902 by subtracting a replica of the feedback signals generated in the replica generator 804 from the signal outputted from the RF receiver 802.

The replica generator 804 generates replica of the feedback signals based on a signal down-converted into signal of a predetermined band by the down-converter 808 and a signal outputted from the subtractor 803, i.e., signal whose feedback signals are first removed, and feeds back the replica to the subtractor 803 at step S903.

The inverse channel estimator 805 generates filter tab coefficients by estimating an inverse of the reception channel including noise, multi-path signals and remaining feedback signals based on the signal outputted from the subtractor 803 at step S904.

The first adaptive filter 806 compensates for the channel distortion of the signal outputted from the subtractor 803 based on the filter tab coefficients generated by the inverse channel estimator 805 at step S905.

The RF transmitter 807 converts the signal outputted from the first adaptive filter 806 into RF signal and wirelessly transmits the signal through the RF transmission antenna 809 at step S906.

The down-converter 808 down-converts the RF signal converted by RF transmitter 807 into signal of a predetermined band at step S907.

Figure 10:
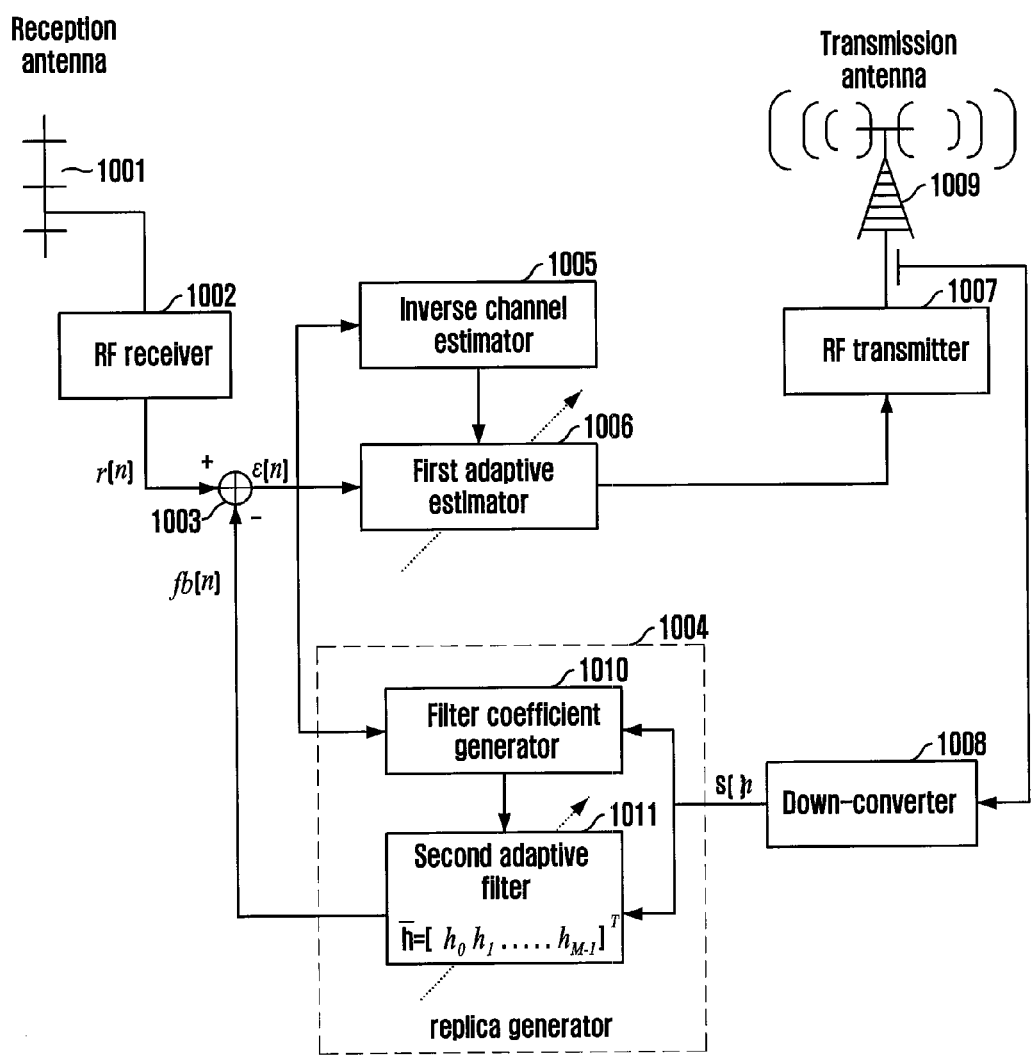
FIG. 10 is a block diagram illustrating the on-channel repeater of FIG. 8.

FIG. 10 is a block diagram illustrating the on-channel repeater of FIG. 8.

Therefore, a reception antenna 1001, an RF receiver 1002, an inverse channel estimator 1005, a first adaptive filter 1006, an RF transmitter 1007, and a transmission antenna 1009 correspond to the reception antenna 801, the RF receiver 802, the inverse channel estimator 805, the first adaptive filter 806, the RF transmitter 807, and the RF transmission antenna 809.

Meanwhile, a replica generator 1004 includes a filter coefficient generator 1010 and a second adaptive filter 1011. The filter coefficient generator 1010 generates filter tab coefficients used in the second adaptive filter 1011 based on the signal acquired from the down-conversion into signal of a predetermined band by the down-converter 1008 and signal outputted from a subtractor 1003. The second adaptive filter 1011 generates replica of feedback signals based on filter tab coefficients generated in the filter coefficient generator 1010 and the signal acquired from the down-conversion into signal of a predetermined band by the down-converter 1008. The second adaptive filter 1011 feeds back the replica to the subtractor 1003.

The filter coefficient generator 1010 calculates filter tab coefficients $\overline{h_n}$ in a time index n according to Equation 2 based on a Least Mean Square (LMS) algorithm.

$$\overline{h_n} = \overline{h_{n-1}} + \lambda \cdot \epsilon(n) \cdot \overline{s_n}^*$$

$$\overline{h_n} = [h_0(n) h_1(n) \ldots h_{M-1}(n)]^T$$

$$\overline{h_{n-1}} = [h_0(n-1) h_1(n-1) \ldots h_{M-1}(n-1)]^T$$

$$\overline{s_n} = [s(n) s(n-1) \ldots s(n-M+1)]^T \qquad \text{Eq. 2}$$

where $\overline{s_n}$ is a signal vector acquired from the down-conversion into signal of a predetermined band by the down-converter 1008 in a time index n; $\epsilon(n)$ is an output signal of the subtractor 803 in the time index n; $\overline{h_{n-1}}$ is filter tab coefficients in a time index (n−1); $\lambda$ is a constant for determining a convergence speed; M is a transpose; and * is a complex conjugate.

The second adaptive filter 1011 calculates a replica fb(n) of the feedback signal according to Equation 3 by filtering the down-converted signal vector $\overline{s_n}$ outputted from the down-converter 1008 based on filter tab coefficients $\overline{h_n}$ generated in the filter coefficient generator 1010.

$$fb(n) = \overline{h_n}^T \cdot \overline{s_n} \qquad \text{Eq. 3}$$

According to Equation 4, the subtractor 1003 removes the feedback signals caused by low isolation of the transmission/reception antenna by subtracting replica fb(n) of feedback signals calculated in the second adaptive filter 1011 in an output signal r(n) of the RF receiver 1002.

$$\epsilon(n+1) = r(n) - fb(n) \qquad \text{Eq. 4}$$

Figure 11:
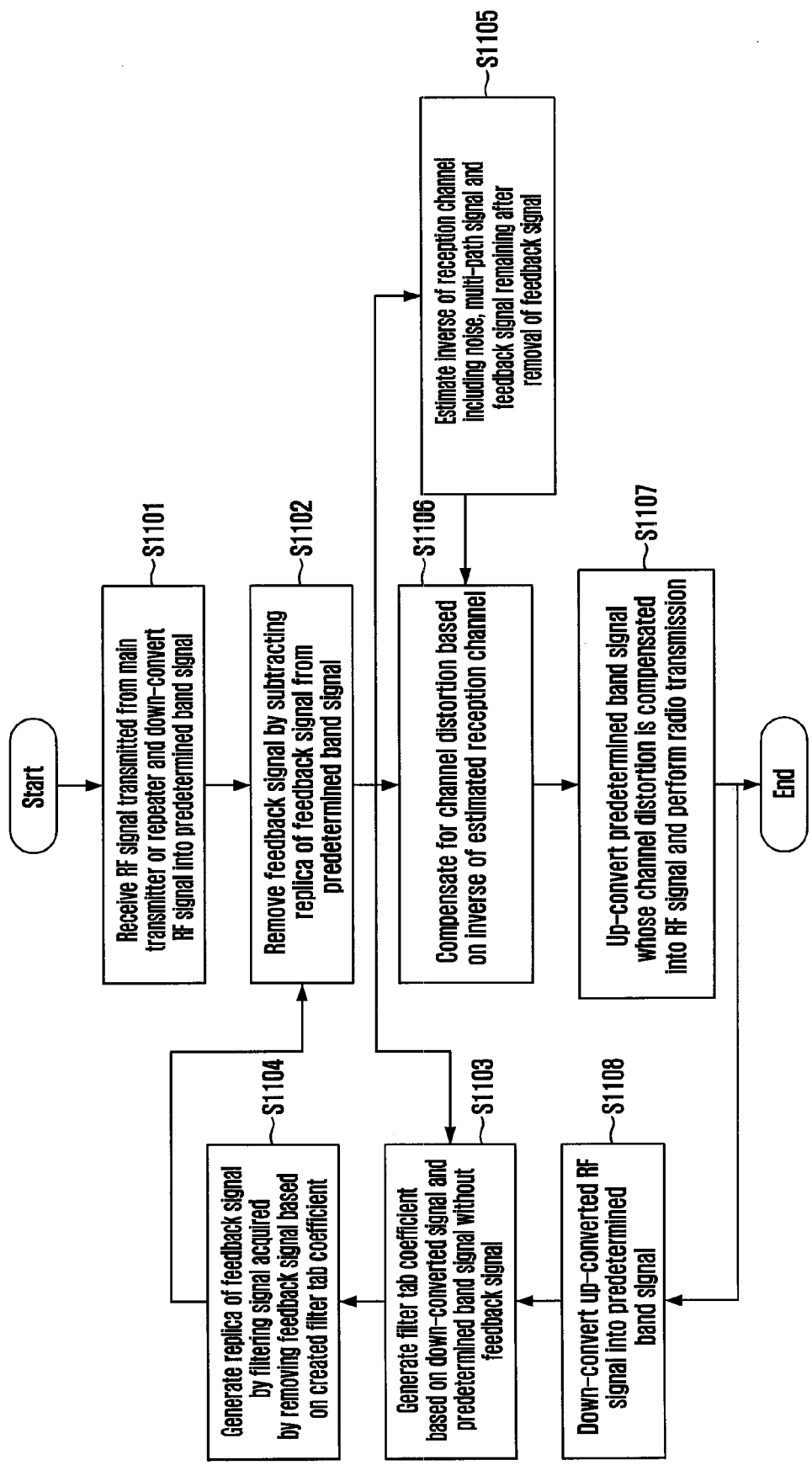
FIG. 11 is a flowchart illustrating the repeating method in the on-channel repeater of FIG. 8

FIG. 11 is a flowchart illustrating the repeating method in the on-channel repeater of FIG. 8.

Referring to FIG. 11, RF signal transmitted from the main transmitter or another repeater is received through the reception antenna 1001, and down-converted into signal of a desired band in the RF receiver 1002 at step S1101.

The subtractor 1003 removes feedback signals from the output signal of the RF receiver 1002 by subtracting a replica of feedback signals generated in the second adaptive filter 1006 from the signal outputted from the RF receiver 1002 at step S1102.

The filter coefficient generator 1010 of the replica generator 1004 generates filter tab coefficients in the second adaptive filter 1011 based on signal acquired from the down-conversion into signal of a predetermined band by the down-converter 1008 and signal outputted from the subtractor 1003 acquired by removing the feedback signals at step S1103. The second adaptive filter 1011 generates a replica of feedback signals by filtering the output signal of the down-converter 1008 based on the filter tab coefficients generated in filter coefficient generator 1010, and feeds back the a replica to the subtractor 1003 at step S1104.

The inverse channel estimator 1005 generates filter tab coefficients by estimating an inverse of the reception channel including noise, multi-path signals and remaining feedback signals caused in the reception channel based on the signal outputted from the subtractor 1003 at step S1105.

The first adaptive filter 1006 compensates for channel distortion of the signal outputted from the subtractor 1003 based on the filter tab coefficients generated by the inverse channel estimator 1005 at step S1106.

The RF transmitter 1007 converts the signal outputted from the first adaptive filter 1006 into an RF signal and performs radio transmission through the transmission antenna 1009 at step S1107.

The down-converter 808 down-converts the RF signal converted by the RF transmitter 807 into signal of a predetermined band at step S1108.

Figure 12:
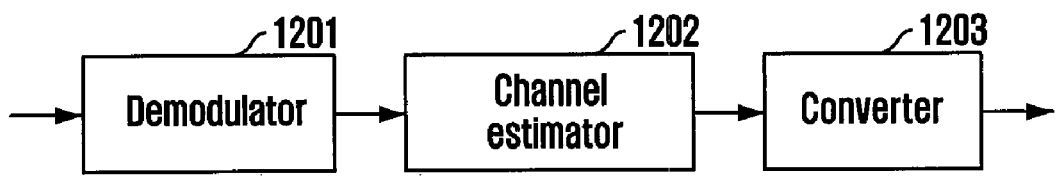
FIG. 12 is a block diagram illustrating an inverse channel estimator of FIG. 8.

FIG. 12 is a block diagram illustrating the inverse channel estimator 805 of FIG. 8.

Referring to FIG. 12, the inverse channel estimator 805 includes a demodulating unit 1201, a channel estimating unit 1202 and a converting unit 1203.

The demodulating unit 1201 demodulates the signal outputted from the subtractor 803 through a frequency and timing synchronizing procedure.

The channel estimating unit 1202 estimates channel distortion of the repeater reception channel including noise, multi-path signals and remaining feedback signals caused in a channel between the main transmitter and the on-channel repeater based on the signal demodulated by the demodulating unit 1201.

The converting unit 1203 generates filter tab coefficients used in the first adaptive filter 806 by estimating an inverse of the reception channel from the channel distortion information of the reception channel estimated by the channel estimating unit 1202.

The demodulating unit 1201, the channel estimating unit 1202, and the converting unit 1203 of FIG. 12 may be formed diversely according to system standards.

Figure 13:
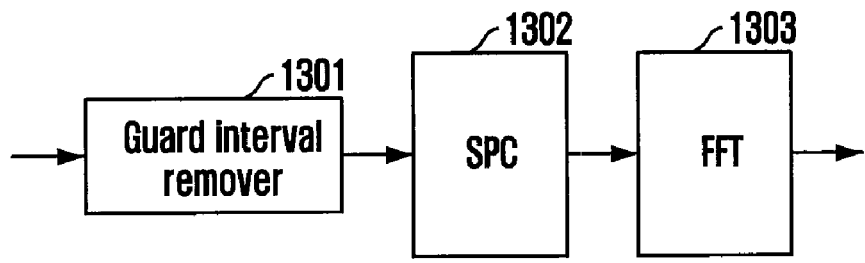
FIG. 13 is a block diagram showing a demodulating unit of FIG. 12 and it may be applied to the DVB-T DTV standard.
Figure 14:
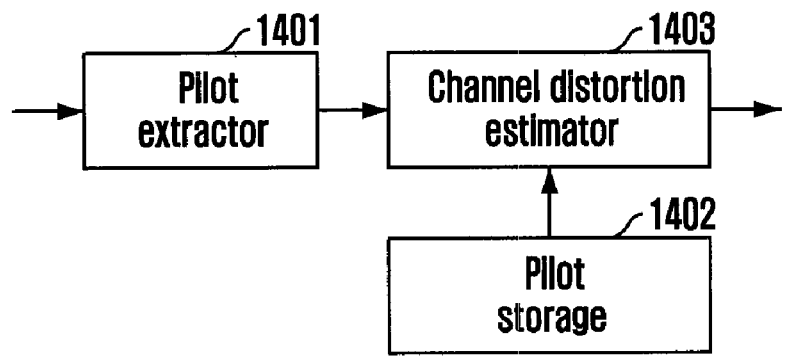
FIG. 14 is a block diagram showing a channel estimating unit of FIG. 12 and it may be applied to the DVB-T DTV standard.
Figure 15:
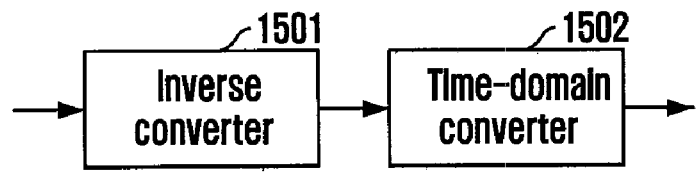
FIG. 15 is a block diagram showing a converting unit 1203 of FIG. 12 and it may be applied to the DVB-T DTV standard.

In FIGS. 13 to 15, embodiments of the demodulating unit 1201, the channel estimating unit 1202, and the converting unit 1203 in a DVB-T DTV standard using an Orthogonal Frequency Division Multiplexing (OFDM) modulating technique will be described hereinafter.

FIG. 13 is a block diagram showing the demodulating unit 1201 of FIG. 12 and it may be applied to the DVB-T DTV standard.

The demodulating unit 1201 includes a guard interval remover 1301, a serial-to-parallel converter (SPC) 1302, and a Fast Fourier Transformer (FFT) 1303.

The guard interval remover 1301 removes a guard interval from a signal outputted from the subtractor 1003. The serial-to-parallel converter 1302 converts the signal whose guard interval is removed by the guard interval remover 1301 into a parallel signal. The Fast Fourier Transformer 1303 converts the parallel signal converted by the serial-to-parallel converter 1302 into a frequency domain.

FIG. 14 shows the channel estimating unit 1202 of FIG. 12 and it may be applied to the DVB-T DTV standard.

The channel estimating unit 1202 includes a pilot extractor 1401, a pilot storage 1402 and a channel distortion estimator 1403.

The pilot extractor 1401 extracts a pilot signal from an output signal of the demodulating unit 1201. The pilot storage 1402 stores a predetermined pilot signal. The channel distortion estimator 1403 estimates channel distortion by comparing the pilot signal extracted by the pilot extractor 1401 with the pilot signal stored in the pilot storage 1402.

FIG. 15 is a block diagram showing the converting unit 1203 of FIG. 12 and it may be applied to the DVB-T DTV standard.

The converting unit 1203 includes an inverse converter 1501 and a time-domain converter 1502.

The inverse converter 1501 generates inverse of channel distortion based on channel distortion information estimated by channel estimating unit 1202. The time-domain converter 1502 converts the inverse of the channel distortion generated in the inverse converter 1501 into filter tab coefficients of time domain.

Figure 16:
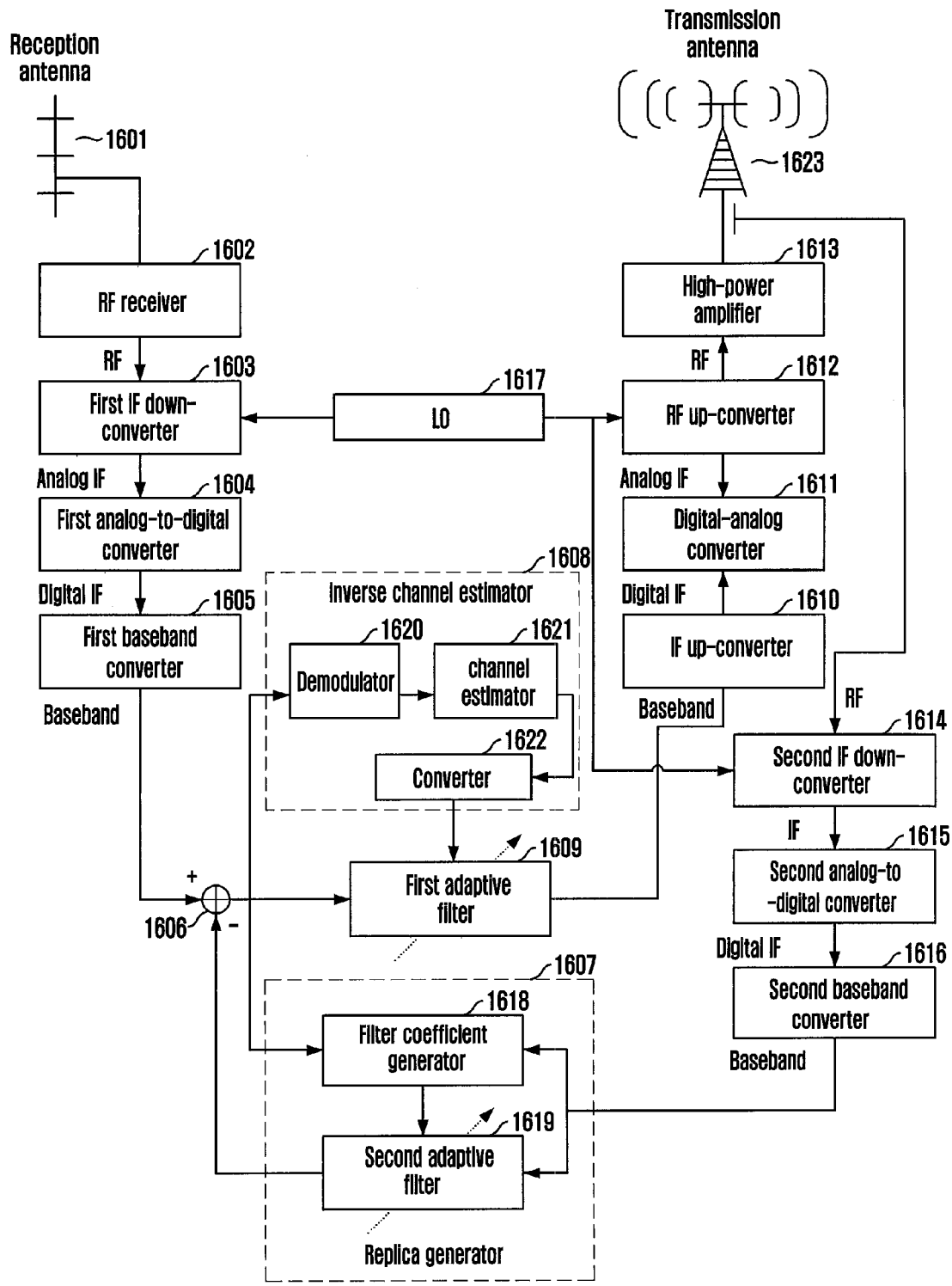
FIG. 16 is a block diagram showing the on-channel repeater in accordance with another embodiment of the present invention.

FIG. 16 is a block diagram showing the on-channel repeater in accordance with another embodiment of the present invention.

FIG. 16 has the same format as FIG. 8 except that a signal is converted into a baseband signal in a transmitter/receiver.

Therefore, a subtractor 1606, a replica generator 1607, an inverse channel estimator 1608 and a first adaptive filter 1609 individually correspond to the subtractor 803, the replica generator 804, inverse channel estimator 805 and the first adaptive filter 806, respectively.

An RF receiver 1602 receives RF signal from the main transmitter or another repeater through the reception antenna 1601.

A first Intermediate Frequency (IF) down-converter 1603 down-converts the received RF signal into IF signal based on a reference frequency provided from a local oscillator 1617. A first analog-to-digital converter 1604 converts the analog IF signal outputted from the first IF down-converter 1603 into digital IF signal. The first baseband converter 1605 converts the output signal of the first analog-to-digital converter 1604 into baseband signal.

An IF up-converter 1610 converts the signal outputted from the first adaptive filter 1609 into IF signal. A digital-analog converter 1611 converts the digital IF signal outputted from the IF up-converter 1610 into analog IF signal. An RF up-converter 1612 up-converts the output signal of the digital-analog converter 1611 into RF signal based on a reference frequency provided from the local oscillator 1617.

The RF signal acquired from the up-conversion in the RF up-converter 1612 is amplified by the high-power amplifier 1613.

Through the second IF down-converter 1614, the RF signal amplified by the high-power amplifier 1613 is down-converted into signal of IF band which is the same as the band of analog IF signal acquired from the down-conversion in the first IF down-converter 1603 based on the reference frequency provided from the local oscillator 1617.

A second analog-to-digital converter 1615 converts the output signal of the second IF down-converter 1614 into digital IF signal. A second baseband converter 1616 converts the output signal of the second analog-to-digital converter 1615 into baseband signal. The replica generator 1607 generates a replica of the feedback signals based on the signal acquired from the down-conversion into the baseband signals in the second baseband converter 1616 and outputted signal from the subtractor 1606, i.e., signal acquired by removing the feedback signals, and feeds back the signal to the subtractor 1606.

That is, a filter coefficient generator 1618 of the replica generator 1607 generates filter tab coefficients of a second adaptive filter 1619 based on the signal acquired from the down-conversion into baseband signal by the second baseband converter 1616 and signal outputted from the subtractor 1606, i.e., signal acquired by removing the feedback signals. The second adaptive filter 1619 generates a replica of the feedback signals by filtering the signal acquired from the down-conversion into the baseband signal by the second baseband converter 1616 based on the filter tab coefficients generated in the filter coefficient generator 2618.

The local oscillator 1617 generates and provides a reference frequency to the first IF down-converter 1603, the second IF down-converter 1614, and the RF up-converter 1612.

Although the on-channel repeating method and the on-channel repeater which improve feedback signal removing capability in accordance with the present invention are proper to broadcastings such as Advanced Television Systems Committee (ATSC), Digital Video Broadcasting (DVB), Digital Multimedia Broadcasting (DMB) and Integrated Service Digital Broadcasting-Terrestrial (ISDB-T), and communications such as wireless broadband (Wibro) and Code Division Multiple Access (CDMA), they are not limited to these examples and can be applied anywhere in an environment which requires a repeater to configure a general single frequency network.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention can increase efficiency of limited frequency resources by repeating a signal that is the same as output signal of a main transmitter, has a short time delay between the output signals of the repeater and the main transmitter, and has its distortion caused in a transmission channel compensated.

What is claimed is:

1. An on-channel repeating method, comprising:
   receiving a Radio Frequency (RF) signal and converting the RF signal into a predetermined band signal;
   subtracting a replica of feedback signals from the received signal;
   estimating an inverse of a reception channel based on the signal acquired from the subtraction and generating a filter tab coefficients;
   compensating for channel distortion of the signal acquired from the subtraction based on the generated filter tab coefficients;
   performing radio transmission by converting the signal whose channel distortion is compensated into an RF signal; and
   down-converting the RF signal acquired in the transmitting means into the predetermined band signal,
   wherein the replica is calculated based on the predetermined band signal acquired from the down-conversion and the signal acquired from the subtraction and is fed back to said subtracting the replica of the feedback signal.

2. The on-channel repeating method of claim 1, wherein the replica includes:
   calculating a filter tab coefficients in a time index n based on the predetermined band signal in a time index n, the signal acquired from the subtraction in the time index n, and the filter tab coefficients in a time index n−1, and
   calculating a replica based on the filter tab coefficients in the time index n and the predetermined band signal.

3. The on-channel repeating method of claim 2, wherein in said calculating the filter tab coefficients, a filter tab coefficient vector is calculated based on a Least Mean Square (LMS) algorithm.

4. The on-channel repeating method of claim 3, wherein in said calculating the filter tab coefficients, the filter tab coefficient vector $\overline{h_n}$ is calculated according to Equation 1:

$$\overline{h_n} = \overline{h_{n-1}} + \lambda \cdot \epsilon(n) \cdot \overline{s_n}^*$$

$$\overline{h_n} = [h_0(n) h_1(n) \ldots h_{M-1}(n)]^T$$

$$\overline{h_{n-1}} = [h_0(n-1) h_1(n-1) \ldots h_{M-1}(n-1)]^T$$

$$\overline{s_n} = [s(n) s(n-1) \ldots s(n-M+1)]^T \quad \text{Eq. 1}$$

where $\overline{s_n}$ is a signal vector acquired from the down-conversion into the predetermined band in the time index n; $\epsilon(n)$ is a signal acquired from the subtraction in the time index n; $\lambda$ is a constant for determining a convergence speed; M is the number of filter tabs; T is a transpose; and * is a complex conjugate.

5. The on-channel repeating method of claim 4, wherein in said calculating the replica,
   the replica fb(n) is calculated according to Equation 2:

$$fb(n) = \overline{h_n}^T \cdot \overline{s_n} \quad \text{Eq. 2}$$

6. The on-channel repeating method of claim 5, wherein in said subtracting the replica of the feedback signal,
   the replica is subtracted from the predetermined band signal acquired from the said receiving RF signal and converting the RF signal according to Equation 3:

$$\epsilon(n+1) = r(n) - fb(n) \quad \text{Eq. 3}$$

where r(n) is the predetermined band signal acquired from the conversion in said receiving RF signal and converting the RF signal in the time index n; and $\epsilon(n+1)$ is a signal acquired from the subtraction in said subtracting the replica of the feedback signal in the time index n+1.

7. The on-channel repeating method of claim 1, wherein said estimating the inverse of the reception channel includes:
   demodulating the signal acquired from the subtraction in said subtracting the replica of the feedback signal;
   estimating channel distortion information of a repeater reception channel based on the signal acquired from the demodulation in said demodulating the signal; and
   calculating an inverse of the reception channel based on the estimated channel information and generating a filter tab coefficients based on the calculated inverse of the reception channel.

8. The on-channel repeating method of claim 7, wherein said demodulating the signal includes:
   removing a guard interval of the signal acquired from the subtraction in said subtracting the replica of the feedback signal;
   converting the signal without a guard interval into a parallel signal; and
   transforming the parallel signal into a frequency domain.

9. The on-channel repeating method of claim 7, wherein said estimating channel distortion information of the repeater reception channel includes:
   extracting a pilot signal from the demodulated signal;
   storing a predetermined pilot signal; and
   estimating channel distortion by comparing the extracted pilot signal with the stored pilot signal.

10. The on-channel repeating method of claim 7, wherein said calculating an inverse of the reception channel and generating the filter tab coefficients includes:
    generating an inverse of channel distortion based on the estimated channel distortion information; and
    converting the inverse of the channel distortion into a filter tab coefficients of a time domain.

11. The on-channel repeating method of claim 1, wherein said down-converting the RF signal includes:
    down-converting the RF signal acquired from the conversion in said performing radio transmission into an IF signal;
    converting the IF signal into a digital IF signal; and
    converting the digital IF signal into the predetermined band signal.

12. The on-channel repeating method of claim 1, wherein said receiving RF signal and converting the RF signal includes:
    receiving an RF signal;
    down-converting the RF signal into an IF signal:
    converting the IF signal into a digital IF signal; and
    converting the digital IF signal into the predetermined band signal.

13. The on-channel repeating method of claim 1, wherein said performing radio transmission includes:
    converting the signal whose channel distortion is compensated in the step of compensating for channel distortion of the signal into a digital IF signal;
    converting the digital IF signal converted in the step of converting the signal whose channel distortion is compensated into the digital IF signal into an analog IF signal;
    up-converting the analog IF signal into an RF signal; and
    amplifying the RF signal.

14. An on-channel repeater, comprising:
    a receiving means for receiving a Radio Frequency (RF) signal and converting the RF signal into a predetermined band signal;

a subtracting means for subtracting a replica of feedback signals from the signal received in the receiving means;

an inverse channel estimating means for estimating an inverse of a reception channel based on the signal acquired from the subtraction in the subtracting means and generating a filter tab coefficients;

a first adaptive filtering means for compensating for channel distortion of the signal acquired from the subtraction in the subtracting means based on the filter tab coefficients generated by the inverse channel estimating means;

a transmitting means for converting the signal whose channel distortion is compensated by the first adaptive filtering means into an RF signal and performing radio transmission;

a down-converting means for down-converting the RF signal acquired in the transmitting means into the predetermined band signal; and a replica generating means for calculating a replica based on the predetermined band signal acquired from the conversion in the down-converting means and the signal acquired from the subtraction in the subtracting means, and feeding back the replica to the subtracting means.

* * * * *